US012637393B2

(12) United States Patent
Harrington et al.

(10) Patent No.: US 12,637,393 B2
(45) Date of Patent: May 26, 2026

(54) ADVANCED COATING CHEMISTRIES FOR CMCS

(71) Applicant: Rolls-Royce Corporation, Indianapolis, IN (US)

(72) Inventors: Gregory John Kenneth Harrington, Indianapolis, IN (US); Li Li, Indianapolis, IN (US); Robert Alexander Sean Golden, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 790 days.

(21) Appl. No.: 17/929,255

(22) Filed: Sep. 1, 2022

(65) Prior Publication Data

US 2024/0076245 A1 Mar. 7, 2024

(51) Int. Cl.
| | |
|---|---|
| *C04B 41/85* | (2006.01) |
| *C04B 41/45* | (2006.01) |
| *C04B 41/50* | (2006.01) |

(52) U.S. Cl.
CPC .......... *C04B 41/85* (2013.01); *C04B 41/4582* (2013.01); *C04B 41/5024* (2013.01); *C04B 2235/402* (2013.01); *C04B 2235/96* (2013.01)

(58) Field of Classification Search
None
See application file for complete search history.

(56) References Cited

U.S. PATENT DOCUMENTS

| | | | |
|---|---|---|---|
| 6,777,093 | B1 | 8/2004 | Ojard et al. |
| 8,940,417 | B2 | 1/2015 | Courcot et al. |
| 10,214,456 | B2 | 2/2019 | Kirby et al. |
| 11,401,217 | B2 | 8/2022 | Kirby et al. |
| 2004/0234740 | A1 | 11/2004 | Ojard et al. |
| 2004/0234784 | A1 | 11/2004 | Eaton et al. |
| 2010/0129636 | A1 | 5/2010 | Cybulsky et al. |
| 2010/0154422 | A1 | 6/2010 | Kirby et al. |
| 2014/0162027 | A1 | 6/2014 | Meschter et al. |
| 2014/0261080 | A1 | 9/2014 | Lee |
| 2016/0265367 | A1 | 9/2016 | Rosenzweig et al. |
| 2017/0101348 | A1 | 4/2017 | Wan et al. |

(Continued)

FOREIGN PATENT DOCUMENTS

| | | | | | |
|---|---|---|---|---|---|
| CN | 107001160 | B | * 12/2022 | ............. | C04B 41/89 |
| EP | 3141631 | A1 | 3/2017 | | |

(Continued)

OTHER PUBLICATIONS

CN-107001160-B Eng Trans (Year: 2022).*

(Continued)

*Primary Examiner* — Jeffrey D Washville
(74) *Attorney, Agent, or Firm* — Shumaker & Sieffert, P.A.

(57) ABSTRACT

An article having a coating system configured to inhibit or prevent crystallization of TGO at the operating temperature of the article. An article includes a substrate defining a (Continued)

surface and a coating layer that includes a dopant configured to inhibit crystallization of amorphous silicon dioxide thermally grown oxide on the bond coat at an operating temperature of the article. The dopant includes a glass modifier. By inhibiting or preventing TGO crystallization, the described coating systems may increase a useable life of the component.

20 Claims, 10 Drawing Sheets

(56)                    References Cited

U.S. PATENT DOCUMENTS

| | | | |
|---|---|---|---|
| 2017/0218779 | A1 | 8/2017 | Luthra et al. |
| 2018/0079687 | A1 | 3/2018 | Kirby et al. |
| 2018/0079689 | A1 | 3/2018 | Kirby et al. |
| 2018/0201544 | A1 | 7/2018 | Kirby et al. |
| 2022/0024827 | A1 | 1/2022 | Golden et al. |

FOREIGN PATENT DOCUMENTS

| | | | |
|---|---|---|---|
| EP | 3153487 | A1 | 4/2017 |
| WO | 2018/052741 | A1 | 3/2018 |
| WO | 2021/176164 | A1 | 9/2021 |

OTHER PUBLICATIONS

Klemm et al., "Delayed Formation of Thermally Grown Oxide in Environmental Barrier Coatings for Non-Oxide Ceramic Matrix Composites", Coatings, vol. 10, No. 1, MDPI, Dec. 19, 2019, 11 pp.

Richards et al., "Ytterbium Silicate Environmental Barrier Coatings", University of Virginia, May 2015, 322 pp.

Xu et al., "Crystallization and Amorphization of Cristobalite", Journal of Inorganic Materials, vol. 22, No. 4, Jul. 2007, pp. 577-582. Translation provided for only the Abstract.

Lamkin et al., "Oxygen Mobility in Silicon Dioxide and Silicate Glasses: a Review", State of the Art, Journal of the European Ceramic Society 10, Jul. 3, 1991, 21 pp.

Lee et al., "Yb2SiO7 Environmental barrier coatings with reduced bond oxidation rates via chemical modifications for long life", Journal of Amercian Ceramic Society, Jul. 19, 2018, 15 pp.

Office Action from U.S. Appl. No. 18/590,844 dated Aug. 27, 2025, 10 pp.

Response to Office Action dated Aug. 27, 2025 from U.S. Appl. No. 18/590,844, filed Nov. 28, 2025, 9 pp.

Final Office Action from U.S. Appl. No. 18/590,844 dated Feb. 3, 2026, 11 pp.

Notice of Allowance from U.S. Appl. No. 18/590,844 dated Mar. 31, 2026, 9 pp.

Response to Final Office Action dated Feb. 3, 2026 from U.S. Appl. No. 18/590,844, filed Mar. 18, 2026, 7 pp.

* cited by examiner

310

326

330A        330B        330C

320

314

325

318

312

320 322D

322C

322B

322A

324

316

421 —

521 523

A D5.1 x4.0k 20 µm

802 — RECEIVE COATING LAYER FORMULATION DOPED WITH A DOPANT

804 — FORM BOND COAT ON SUBSTRATE

806 — FORM FIRST COATING LAYER ON BOND COAT

808 — FORM SECOND COATING LAYER ON FIRST COATING LAYER

810 — FORM THIRD COATING LAYER ON SECOND COATING LAYER

1

ADVANCED COATING CHEMISTRIES FOR CMCS

TECHNICAL FIELD

The present disclosure generally relates to coatings for ceramic or ceramic matrix composite materials.

BACKGROUND

Ceramic or ceramic matrix composite (CMC) materials may be useful in a variety of contexts where mechanical and thermal properties are important. Ceramic or CMC materials may be resistant to high temperatures, but some ceramic or CMC materials may react with some elements and compounds present in the operating environment of high temperature mechanical systems, such as water vapor. Reaction with water vapor may result in the recession of the ceramic or CMC material. These reactions may damage the ceramic or CMC material and alter mechanical properties of the ceramic or CMC material, which may reduce the useful lifetime of the component. Thus, in some examples, a ceramic or CMC material may be coated with an environmental barrier coating (EBC), which may reduce exposure of the substrate to elements and/or compounds present in the operating environment of high temperature mechanical systems.

SUMMARY

The disclosure describes coating systems that include a doped coating layer on a substrate. The coating layer may be deposited directly on the substrate as a bond coat, deposited on the bond coat as an environmental barrier coating (EBC), or disposed between a bond coat and an EBC as an intermediate layer. The disclosed coating system may inhibit or prevent crystallization of TGO at the operating temperature of the component. By inhibiting or preventing TGO crystallization, the described coating systems may increase a useable life of the component.

In some examples, the disclosure describes an article that includes a substrate defining a surface and a coating layer. The coating layer includes a dopant configured to inhibit crystallization of amorphous silicon dioxide thermally grown oxide an operating temperature of the article. The dopant includes a glass modifier. The glass modifier may include one or more of one or more of aluminum, sodium, potassium, calcium, iron, one or more rare-earth elements (e.g., yttrium, ytterbium), or mixtures or combinations thereof.

In some examples, the disclosure describes a coating system of a gas turbine engine component that includes a coating layer on a ceramic matrix composite (CMC) substrate defining the gas turbine engine component. The CMC substrate includes a silicon-containing material. The coating layer comprises a glass modifier as a dopant, and the dopant is configured to inhibit crystallization of amorphous silicon dioxide thermally grown oxide on the surface of the CMC substrate at an operating temperature of the gas turbine engine component.

In some examples, the disclosure describes a method that includes receiving a coating layer formulation doped with a glass modifier as a dopant. The dopant is configured to inhibit crystallization of amorphous silicon dioxide thermally grown oxide on a surface at an operating temperature of an article. The method includes depositing the coating layer formulation on a substrate defining a surface to form a coating layer.

DETAILED DESCRIPTION

Figure 1:
FIG. 1 is a conceptual diagram illustrating a cross-sectional view of an example article that includes a substrate and a coating system that includes a coating layer having a dopant.
Figure 1:
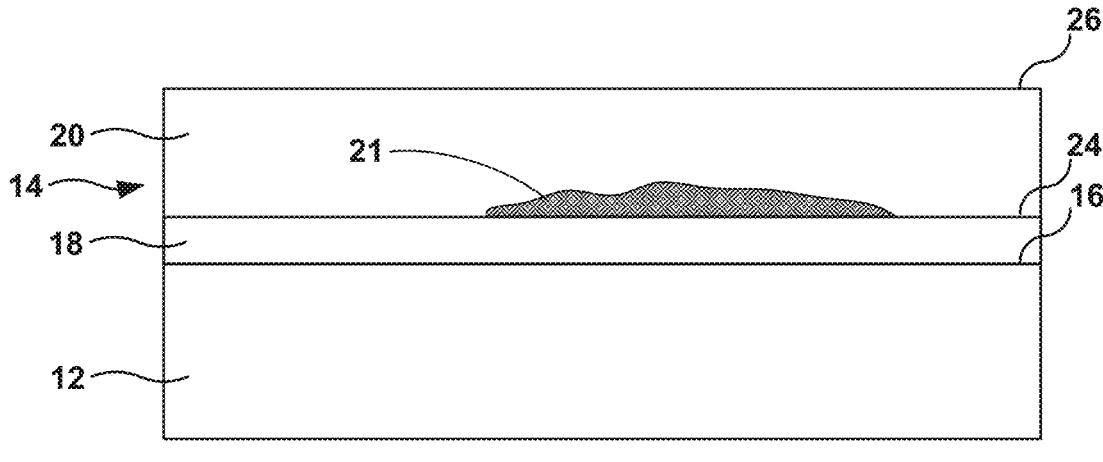
Figure 1:
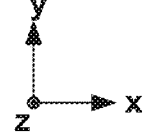

The disclosure describes coating systems that include a coating layer having a dopant on a silicon containing bond coat and/or substrate. In some examples, the coating system may be on a substrate, such as a ceramic or ceramic matrix composite (CMC) substrate, defining a component of a high temperature mechanical system, such as a gas turbine engine component. The silicon bond coat may be on the substrate to improve adhesion of overlaying layers of the coating system, such as an environmental barrier coating (EBC) and/or an abradable coating.

During operation, the component may be exposed to combustion gases. Elements and compounds present in the combustion gases may react with or degrade a portion of the coating system (e.g., a bond coat and/or an EBC of the coating system). For example, during operation, a thermally grown oxide (TGO) composed of amorphous silicon dioxide may form on a silicon bond coat. The TGO may crystallize, for example, after prolonged exposure to high temperatures and repeated thermal cycling events of the CMC component. Crystallized TGO may be more prone to cracking than amorphous TGO. Once cracked, the TGO may break apart, resulting in spallation of the coating system, for example, the EBC or other coating layers overlying the bond coat. Spallation of the EBC may expose the silicon bond coat and/or the CMC substrate to high temperatures, pressures, velocities, and water vapor contained within, for example, the gas path of a gas turbine engine. Under these conditions, the silicon bond coat and/or the CMC may oxidize to form additional silicon dioxide TGO, which may volatilize into silica containing gases (e.g., $Si(OH)_4(g)$) in the presence of water vapor. A recess may form in the surface of the CMC, damaging the component and decreasing the useful life of the component. Thus, a coating system with increased resistance to spallation, as well as an understanding of the possible failure and/or degradation mechanisms that lead to spallation, may improve the life of the coating system and, accordingly, the CMC component.

Without being bound to any particular theory, it is believed that one mechanism for spallation of the EBC may be through degradation of the TGO that forms between the EBC and the silicon bond coat. As the TGO forms, it may become a structural element of the coating system (e.g., a coating layer in a coating stack). Therefore, retaining the integrity of the TGO may be important for keeping the EBC adhered to the substrate.

Degradation of coating bond strength and or/coating failures have been observed for TGOs exposed under conditions that induce crystallization of the TGO. The failure mechanism may begin with crystallization of the silicon dioxide TGO into the β-cristobalite phase. Next, cooling of the coating system below 270° C. may induce transformation of β-cristobalite to the α-cristobalite phase (which is characterized by a volume contraction of approximately 5%), which may induce a strain in the TGO. Stresses/strains may accumulate in the TGO since the TGO may be constrained by the silicon containing bond layer or substrate, the EBC layer, and residual amorphous TGO. Cracks (vertical, horizontal, or other) may form in the TGO to relieve accumulated stresses/strains. As the component is thermally cycled continually through operation, above and below 270° C., the α/β-cristobalite transition may be repeatedly activated, causing continued formation of cracks. The formation of horizontal cracks may eventually reduce or eliminate the cross-sectional area of the TGO that is bonding the EBC to the silicon bond coat or CMC substrate, resulting in coating system failure.

Furthermore, cracking in the TGO may reduce hermeticity of the coating system, which may result in growth or accelerated growth of the TGO. This may further exacerbate TGO degradation. Ultimately, the outlined failure mechanism may result in partial or complete spallation of the EBC.

The disclosed coating system may inhibit or prevent crystallization of TGO at the operating temperature of the component, which may reduce, minimize, or eliminate spallation of the coating system. To inhibit or prevent crystallization of TGO, the coating layer includes a dopant configured to migrate into the TGO and stabilize the TGO in an amorphous phase. Inhibiting crystallization of TGO may include at least one of slowing a rate of TGO formation or slowing a rate of TGO crystallization relative to a coating system without a coating layer having a dopant. The coating layer including a dopant may be the bond coat, an intermediate layer between a bond coat and one or more EBC layers, or an EBC layer that overlies the bond coat and/or substrate. The inclusion of a coating layer including a dopant may lead to formation of an amorphous TGO rather than a crystallized TGO, such that at least a portion of the TGO may be maintained in an amorphous phase. The amorphous TGO may be less prone to cracking, and thus less prone to coating loss through spallation.

The dopant may include a glass modifier. As described herein, a glass modifier is an element or compound that interrupts the normal bonding between glass-forming elements and oxygen. Elements defined herein as glass modifiers include, for example, aluminum, sodium, potassium, calcium, iron, one or more rare-earth elements (e.g., yttrium, ytterbium), or mixtures or combinations thereof. These elements may be included in a coating layer as elemental additions, as compounds (e.g., $Al_2O_3$, $Na_2O$, $K_2O$, $Na_2Al_2O_4$, AlSi, CaO, $Fe_2O_3$, $Y_2O_3$, $Yb_2O_3$, or the like), or combinations of elemental additions and compounds. In some examples, the dopant may be introduced as a solid solution constituent within a silicate glass into the raw materials (e.g., the coating layer formulation) of the EBC and/or bond coat, in any of a powder, a slurry, an ingot, a tape, mixtures or combinations thereof, or the like. The coating layer formulation may be deposited on a substrate to form a coating layer including a dopant through one or more deposition processes, which may include one or more of thermal spray (e.g., atmospheric plasma spray (APS), high velocity oxygen fuel (HVOF) thermal spray, suspension plasma spray (SPS), detonation gun (D-Gun) thermal spray, or the like), slurry spray or paste, tape casting, electrophoretic deposition, physical vapor deposition (PVD), chemical vapor deposition (CVD), plasma spray physical vapor deposition (PS-PVD), electron-beam physical vapor deposition (EB-PVD), or the like.

Coating systems described herein may be particularly suitable for components of high temperature, thermally cycling systems that are exposed to an oxidizing atmosphere. The operating temperature of the component may include an operating temperature range of a high temperature mechanical component, such as a gas turbine engine component. For example, the operating temperature may include temperatures up to about 3600° F. (1982° C.), up to about 3000° F. (1649° C.), up to about 2700° F. (1482° C.), up to about 2500° F. (1371° C.), or up to about 2400° F. (1316° C.).

Although the disclosure describes coating systems including bond coats and EBCs, in other examples, the subject matter described herein may be applied to coatings of other types, such as abradable coatings, abrasive coatings, thermal barrier coatings, self-lubricating coatings, or the like. The layer structure and compositions may differ for these different types of coatings, but one or more coating layers including a dopant may be used in these other coating systems.

FIG. 1 is a conceptual diagram illustrating a cross-sectional view of an example article 10 that includes a substrate 12 and coating system 14. Article 10 may be a component of a high temperature mechanical system. For example, article 10 may be a blade track, a blade shroud, an airfoil, a blade, a vane, a combustion chamber liner, an engine hot section component, or the like, of a gas turbine engine.

Substrate 12 may include a ceramic or a ceramic matrix composite (CMC). In examples in which substrate 12 includes a ceramic, the ceramic may be substantially homogeneous. In examples in which substrate 12 includes a CMC, substrate 12 may include a matrix material and a reinforcement material. The matrix material may include a ceramic material, such as, for example, SiC, $Si_3N_4$, $Al_2O_3$, aluminosilicates, $SiO_2$, combinations thereof, or the like. The reinforcement material may include discontinuous whiskers, platelets, or particulates; or continuous monofilament or multifilament weave. In some examples, the composition of the reinforcement material is the same as the composition of the matrix material. For example, a matrix material comprising silicon carbide may surround a reinforcement material comprising silicon carbide whiskers. In other examples, the reinforcement material includes a different composition than the composition of the matrix material, such as aluminosilicate fibers in an alumina matrix, or the like. One composition of a substrate 12 that includes a CMC includes a reinforcement material including silicon carbide continuous fibers embedded in a matrix material including silicon carbide. In some examples, substrate 12 may include a SiC—SiC CMC, in which a fibrous preform including SiC fibers is impregnated with SiC particles from a slurry, then melt infiltrated with silicon metal or a silicon alloy to form the melt-infiltrated SiC—SiC CMC.

In some examples, substrate 12 may include a metal alloy, a metal superalloy, a metal alloy that includes silicon. For example, substrate 12 may include a metal alloy that includes Si, such as a molybdenum-silicon alloy (e.g., $MoSi_2$) or a niobium-silicon alloy (e.g., $NbSi_2$).

Coating system 14 may include a bond coat 18 and a coating 20. As shown in FIG. 1, article 10 includes bond coat 18 on substrate 12. As used herein, "formed on" and "on" mean a layer or coating that is formed on top of another layer or coating, and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent another layer or coating, i.e., there are no intermediate layers or coatings. In some examples, bond coat 18 is directly on a surface 16 defined by substrate 12. Coating 20 may be directly on a surface 24 of bond coat 18.

Bond coat 18 may improve adhesion between substrate 12 and the layer overlying bond coat 18 (e.g., coating 20). Bond coat 18 may include any useful material that improves adhesion between substrate 12 and an overlying layer. In some examples, bond coat 18 may act as a protective layer that decreases migration of an oxidizing agent into substrate 12 by reacting with an oxidizing species to form a protective TGO layer 21. Bond coat 18 may have any suitable thickness. In some examples, a thickness of bond coat 18 may be within a range from about 25.4 micrometers (μm, about 0.001 inch) to about 254 μm (about 0.01 inch). In some examples, article 10 may not include a bond coat 18, and coating 20 may be formed directly on substrate 12.

Coating system 14 (e.g., coating 20) may define an outer surface 26. Coating 20 may include at least one of an environmental barrier coating (EBC). Coating 20 includes one or more layers of material configured to protect substrate 12 during operation of article 10. In some examples, coating 20 also may be configured to reduce or substantially prevent attack of bond coat 18 and/or substrate 12 by chemical species present in the operating environment of article 10, e.g., the operating environment of a high temperature mechanical component. The operating environment of article 10 may include, for example, the intake gas, combustion gas, or exhaust gas of a gas turbine engine. In some examples, coating 20 may include a material that is resistant to oxidation or water vapor attack. Bond coat 18 and/or coating 20 may be formed on substrate 12 using, for example, thermal spray (APS, HVOF, SPS, D-Gun), slurry spray or paste, tape casting, electrophoretic deposition, PVD, CVD, PS-PVD, EB-PVD, or the like.

Article 10 may include at least one component that includes silicon. In examples in which substrate 12 is a ceramic or CMC, bond coat 18 may include a silicon-based bond coat, and may include silicon metal (e.g., elemental silicon; Si), a silicon-containing alloy, a silicon-containing ceramic, or another silicon-containing compound. In some examples, the presence of Si in bond coat 18 may promote adherence between bond coat 18 and substrate 12 and between bond coat 18 and coating 20, such as, for example, when substrate 12, coating 20, or both, includes silicon metal or a silicon-containing alloy or compound. In some examples, substrate 12 may include a silicon-containing ceramic or CMC having a silicon-containing ceramic, such SiO2, silicon carbide (SiC), or silicon nitride ($Si_3N_4$); aluminum oxide ($Al_2O_3$); aluminosilicates (e.g., $Al_2SiO_5$); combinations thereof; or the like.

During operation, Si in substrate 12 and/or bond coat 18 may react with an oxidizing species to form an amorphous silicon dioxide thermally grown oxide (TGO) layer 21 on or near surfaces 16 and/or 24. For example, TGO layer 21 may form on surface 16 of substrate 12 and/or surface 24 of bond coat 18, as illustrated in FIG. 1. As discussed above, the amorphous silicon oxide TGO layer 21 may crystallize and subsequently crack due to the β to α-cristobalite transformation, which may, in some examples, result in spallation of at least a portion of coating system 14, such as coating 20.

To inhibit crystallization of amorphous silicon dioxide in TGO layer 21, coating system 14 includes at least one dopant. The dopant includes one or more elements configured to migrate from bond coat 18 and/or coating 20 into TGO layer 21 and inhibit formation of a crystalline phase of silica from an amorphous phase of silica in at least a portion of TGO layer 21. Without wishing to be bound by any theory, a dopant which includes a glass modifier may, in some examples, change a glass transition temperature ($T_g$) of TGO layer 21. TGO layer 21 including with a different (e.g. higher) $T_g$ may have different viscosity at temperature and different kinetics of crystallization. Accordingly, the crystallization regime of TGO layer 21 may be different due to the dopant. For example, a dopant present in coating 20 may migrate from coating 20 into TGO layer 21 and stabilize an amorphous phase of a portion of TGO layer 21 near surface 24. This amorphous phase may be substantially continuous, thereby forming a hermetic barrier between coating 20 and bond coat 18 regardless of formation of a crystalline phase in another portion of TGO layer 21. As a result, the amorphous phase may reduce further migration of oxidizing species into bond coat 18 to further grow TGO layer 21. In some examples, the dopant may be present in higher concentrations in the amorphous phase portion of TGO layer 21 than in in the crystalline phase portion of TGO layer 21, due to the change in T g as described above. TGO layer 21 including both an amorphous phase portion and a crystalline phase portion may be desirable in some examples. Alternatively, in some examples, TGO layer 21 may include only an amorphous phase portion.

Figure 11:
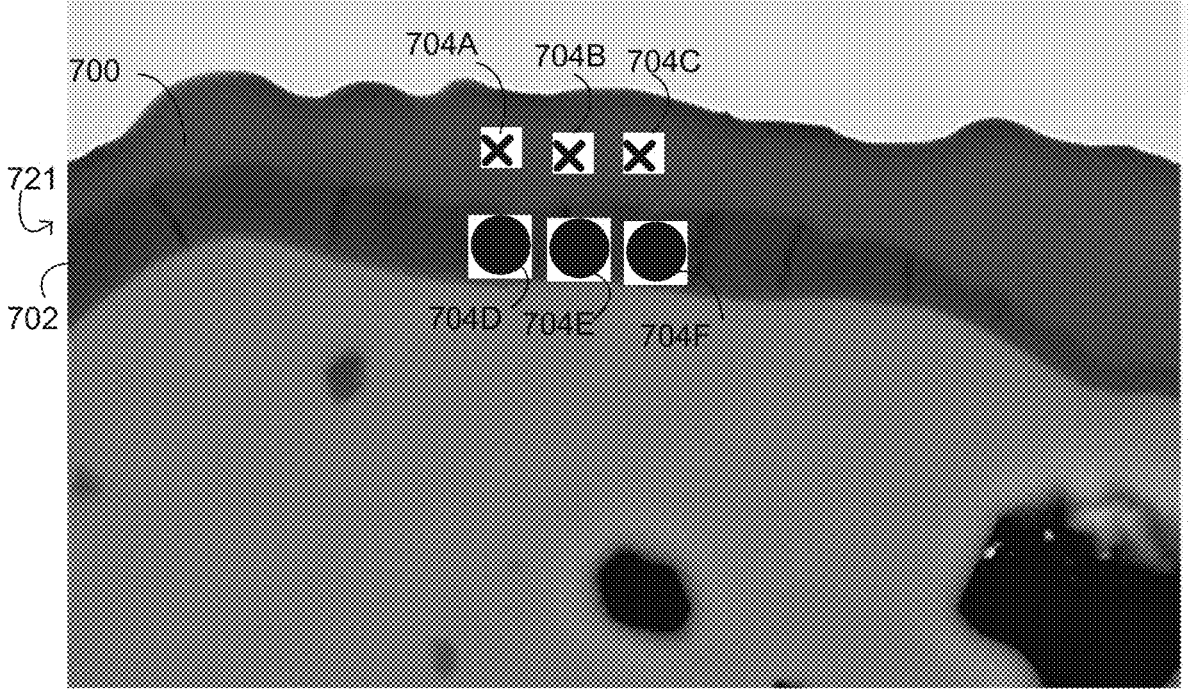
FIG. 11 is an SEM image of a TGO of an example coating system illustrating the composition of the TGO at various locations.

In some examples, bond coat 18 may include a dopant configured to inhibit crystallization of amorphous silicon dioxide thermally grown oxide (TGO) on surface 24 of bond coat 18 at an operating temperature of article 10. Although described herein as included within bond coat 18, the dopant may in some examples be included in coating 20, or in both bond coat 18 and coating 20. In some examples, the doped coating layer may be a portion of bond coat 18. For example, the doped coating layer may be a first region of bond coat 18 at or near surface 24. In this example, a second region of bond coat 18 nearer surface 16 may include less dopant than the first region of bond coat 18. In this way, bond coat 18 may be configured to form a bilayer TGO layer 21 in operation. A bilayer TGO layer 21 may include an amorphous layer on top of a crystalline layer, as illustrated in FIG. 11 and discussed below.

In some examples, at least one layer of coating 20 may include a dopant configured to inhibit crystallization of amorphous silicon dioxide thermally grown oxide on the surface at an operating temperature of the article. The doped layer of coating 20 may be configured to inhibit or prevent crystallization of TGO layer 21 at the operating temperature of article 10.

The doped coating layer of coating system 14 (e.g., bond layer 18, coating 20, or both) may include a glass modifier. The glass modifier may include one or more of aluminum, sodium, potassium, calcium, iron, one or more rare-earth elements (e.g., yttrium, ytterbium), or mixtures or combinations thereof, or the like. In some examples, the dopant or dopants may be selected to be substantially unreactive with RE silicates and/or $SiO_2$. In some examples, substantially unreactive may include, e.g., be limited to, chemical reactions or interactions that do not compromise and/or alter the mechanical properties or the chemical properties of coating system 14. For example, the dopant may react with coating system 14 in a way that results in reaction products that do not interfere with coating performance or occur at such slow rate that the performance of coating system reaches the end of its useful life before the reaction between the dopant and coating system 14 becomes problematic, which may be considered substantially unreactive with coating system 14.

In some examples, an amount of dopant in the doped coating layer of coating system 14 may be within a range from about 0.1 mole percent (mol %) to about 15 mol %, such as from about 0.5 mol % to about 10 mol % or about 1% to about 5%. In some examples, the amount of dopant added to the doped coating layer of coating system 14 may be selected or tailored based on one or more of an anticipated operating temperature, an anticipated oxidizing species encountered, or the like. In some examples, an anticipated oxidizing species encountered may be based partially or totally on a location in a gas turbine engine where coating system 14 is applied, or on a geography the gas turbine engine will operate in, combinations thereof, or the like. Addition of too little dopant into the doped coating layer of coating system 14 may not keep the TGO amorphous. On the other hand, addition of too much dopant into the doped coating layer of coating system 14 may cause deleterious effects, such as causing the TGO to become too soft, increasing oxidation rates by modifying the transport of oxidant species throughout the TGO, or other problems.

The dopant may be present within the doped coating layer as an elemental glass modifier, as a compound, as a solid constituent within a glass, or as a combination of elements, compounds, and solid constituents. Elements that may be used as a glass modifier, as discussed above, include aluminum, sodium, potassium, calcium, iron, one or more rare-earth elements (e.g., yttrium, ytterbium), or mixtures or combinations thereof, or the like. Compounds that may be used as the glass modifier include $Al_2O_3$, $Na_2O$, $K_2O$, $Na_2Al_2O_4$, $AlSi$, $Yb_2O_3$, $Y_2O_3$, $CaO$, $Fe_2O_3$, or mixtures or combinations thereof.

In some examples, the doped coating layer of coating system 14 may include more than one (e.g., at least two, or at least three) of aluminum, sodium, potassium, calcium, iron, or rare-earth elements. For example, the doped coating layer may include aluminum, sodium, and potassium. Inclusion of more than one glass modifier in the dopant may inhibit crystallization of TGO layer 21 more effectively than a dopant including only one glass modifier. In examples where the dopant includes aluminum, potassium, and sodium, the coating layer may include more aluminum than potassium or sodium. For example, the coating layer may include at least 2 mol % aluminum.

In some examples, the dopant may include one or more glass modifiers and one or more optional second dopants. The one or more optional second dopants may be sintering aids configured to densify (e.g., reduce porosity) coating 20 and/or provide a more hermetic coating compared to coating 20 without the one or more optional second dopants. In this way, the one or more optional second dopants may reduce migration of elements or compounds (e.g., oxygen or water vapor) into coating 20.

In examples in which the doped coating layer of coating system 14 includes an EBC, coating 20 may include, in addition to the glass modifier and optional second dopant, an EBC material. The EBC material may include, for example, at least one of mullite; a glass ceramic such as barium strontium aluminosilicate ($BaO$—$SrO$—$Al_2O_3$-$2SiO_2$; BSAS), calcium aluminosilicate ($CaAl_2Si_2O_8$; CAS), cordierite (magnesium aluminosilicate), and lithium aluminosilicate; or one or more rare-earth silicates (silicates of Lu, Yb, Tm, Er, Ho, Dy, Tb, Gd, Eu, Sm, Pm, Nd, Pr, Ce, La, Y, or Sc). The rare-earth silicate may be a rare-earth monosilicate (e.g., $RE_2SiO_5$) and/or a rare-earth disilicate (e.g., $RE_2Si_2O_7$). In some examples, the rare-earth silicate may include two or more rare-earth metals. For example, the doped coating layer of coating 20 includes an EBC may include ($Yb_{0.5}Y_{0.5})_2$—$SiO_5$ and/or ($Yb_{0.5}Y_{0.5})_2$—$Si_2O_7$).

In some examples, the EBC of coating 20 may include an additive in addition to the primary constituents of the EBC. For example, the additive may include at least one of $TiO_2$, $HfSiO_4$, an alkali metal oxide, or an alkali earth metal oxide. The additive may be added to the EBC to modify one or more desired properties of the EBC. For example, the additive components may increase or decrease the reaction rate of the EBC with CMAS, may modify the viscosity of the reaction product from the reaction of CMAS and the EBC, may increase adhesion of the EBC to bond coat 18, may increase or decrease the chemical stability of the EBC, or the like.

In some examples, the EBC of coating 20 may be substantially free (e.g., free or nearly free) of hafnia and/or zirconia. Zirconia and hafnia may be susceptible to chemical attack by CMAS, so an EBC substantially free of hafnia and/or zirconia may be more resistant to CMAS attack than an EBC that includes zirconia and/or hafnia. However, in some examples, the EBC may include zirconia and/or hafnia as sintering aids.

In some examples, the EBC of coating 20 may have a coefficient of thermal expansion (CTE) that is close to substrate 12 and/or bond coat 18. For example, in examples where the EBC includes ytterbium disilicate ($Yb_2Si_2O_7$), bond coat 18 includes silicon (Si) metal, and substrate 12 includes silicon carbide (SiC), ytterbium disilicate may have a CTE of about $4.7 \times 10^{-6\circ}$ $C.^{-1}$, while silicon and silicon carbide may each have a CTE of about $4.5 \times 10^{-6\circ}$ $C.^{-1}$.

In some examples, the dopant may be selected or tuned according to the chemistry of the EBC of coating 20. For example, in examples where the EBC of coating 20 includes a rare-earth disilicate such as $RE_2Si_2O_7$, the dopant may include $Yb_2O_3$. In examples, where the EBC includes a dual cation rare-earth disilicate such as ($Yb_{0.5}Y_{0.5})_2$—$Si_2O_7$), the dopant may include $Yb_2O_3$ and/or $Y_2O_3$. Selecting the dopant based on the chemistry of the EBC of coating 20 may improve the CMAS resistance of the coating and/or may minimize the occurrence of undesired interactions between the EBC of coating 20 and the dopant.

Regardless of the composition of coating 20, in some examples, coating 20 may have a dense microstructure, a porous microstructure, a columnar microstructure, a dense vertically cracked (DVC) structure, or a combination of at least two of dense, porous, or columnar microstructures. A dense microstructure may be more effective in preventing the infiltration of CMAS and other environmental contaminants, while a porous, DVC, or columnar microstructure may be more strain tolerant during thermal cycling. In some examples, coating 20 with a dense microstructure may have a porosity of less than about 10 vol. %, such as less than about 8 vol. %, less than about 5 vol. %, or less than about 2 vol. %, where porosity is measured as a percentage of pore volume divided by total volume of coating 20. In some examples, coating 20 with a porous microstructure may have a porosity of more than about 10 vol. %, such as more than about 15 vol. %, more than 20 vol. %, or more than about 30 vol. %, where porosity is measured as a percentage of pore volume divided by total volume of coating 20.

In some examples, coating 20 may be formed as a substantially non-porous layer. In other examples, coating 20 is formed as a layer that includes a plurality of cracks or pores. In some examples, coating 20 may define a thickness, measured in a direction substantially normal to surface 16 of substrate 12 within a range from about 25.4 (about 0.001 inch) to about 508 μm (about 0.02 inch).

In some examples, coating system 14 may include a plurality of layers, such as two or more of an EBC, an abradable coating, an abrasive coating, a thermal barrier coating (TBC), a self-lubricating coating, or other materials used for coating high temperature mechanical system components. At least one of the layers may be include the doped coating layer configured to inhibit crystallization of amorphous silicon dioxide thermally grown oxide on the surface at an operating temperature of the article.

Figure 2:
FIG. 2 is a conceptual diagram illustrating a cross-sectional view of an example article that includes a substrate and a coating system having a plurality of layers, at least one of which includes a dopant.
Figure 2:
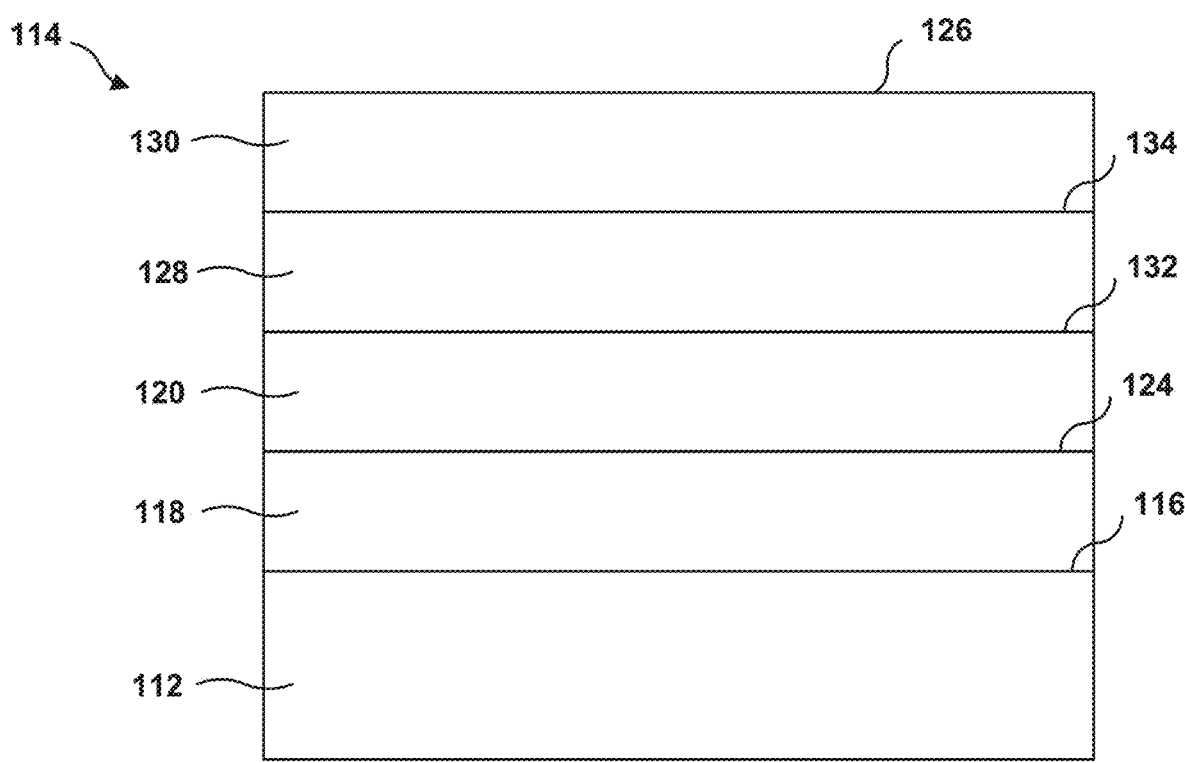
Figure 2:
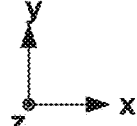

FIG. 2 is a conceptual cross-sectional diagram illustrating an example article 110 that includes coating system 114 having a plurality of layers. Article 110 may be the same as or substantially similar to article 10 described above in reference to FIG. 1, except for the differences described herein. For example, article 110 that includes a substrate 112, a bond coat 118 on a surface 116 of substrate 112, first coating layer 120 on a surface 124 of bond coat 118, a second coating layer 128 on surface 132 of first coating layer 120, and a third coating layer 130 on surface 134 of second coating layer 128. In the example illustrated in FIG. 2, first coating layer 120 includes a doped coating layer, for example, as described above in reference to FIG. 1. Although illustrated as having bond coat 118 and coating layers 120, 128, and 130, in other examples, coating system 114 may have few layers, e.g., bond coat 118 and coating layers 120 and 128, or additional layers, e.g., one or more additional coating layers overlying third coating layer 130.

Article 110 may include a bond coat 118 on substrate 112. In some examples, article 110 does not include bond coat 118. For example, first coating layer 120 may be formed directly on substrate 112. Article 110 may not include bond coat 118 when the layer on substrate 112 (e.g., first coating layer 120) and substrate 112 are sufficiently chemically and/or mechanically compatible. For example, in examples where first coating layer 120 and substrate 112 adhere sufficiently strongly to each other, article 110 may not include bond coat 118. Additionally, in examples where the coefficients of thermal expansion of substrate 112 and first coating layer 120 are sufficiently similar, article 110 may not include bond coat 118. First coating layer 120 may be the same as or substantially similar to coating 20 described above in reference to FIG. 1. For example, first coating layer 120 may include the doped coating layer, as described above in reference to FIG. 1.

Second coating layer 128 is on surface 132 of first coating layer 120. Second coating layer 128 may be similar to or substantially the same (e.g., the same or nearly the same) as coating 20 described in reference to FIG. 1 or, in some examples, first coating layer 120. In some examples, second coating layer 128 may include an EBC (without a dopant), an abradable coating, an abrasive coating, a thermal barrier coating, a self-lubricating coating, or other materials used for coating high temperature mechanical system components.

In examples in which second coating layer 128 includes an EBC, second coating layer may include one or more of the EBC materials described above in reference to FIG. 1, a mixture of stoichiometric $RE_2SiO_5:RE_2Si_2O_7$, or a $SiO_2$-lean RE monosilicate and/or disilicate (e.g., a composition having less $SiO_2$ than $RE_2SiO_5$ and/or $RE_2Si_2O_7$. In some examples, a $SiO_2$-lean RE monosilicate or disilicate may include between about 33.4 to 99.9 mol. % of RE oxide (e.g., $RE_2O_3$) and balance mol. % $SiO_2$.

In examples in which second coating layer 128 includes an abradable coating, the abradable coating may be configured to protect article 110, e.g., coating system 114, from physical damage, such as abrasion or impact against other components or debris. An abradable coating may be configured to be abraded, e.g., by a blade of a gas turbine engine, in order to form a relatively tight seal between article 110 and another component, such as, for example, a blade of a gas turbine engine. In some examples, abradability may include a disposition to break into relatively small pieces when exposed to a sufficient physical force. Abradability may be influenced by the material characteristics of the material(s) in the abradable coating, such as fracture toughness and fracture mechanism (e.g., brittle fracture), as well as the porosity of the abradable coating. In some examples, the abradable costing may exhibit thermal shock resistance and high-temperature capability.

The abradable coating may include any suitable material. For example, the abradable coating may include at least one of a rare-earth oxide, a rare-earth silicate, an aluminosilicate, or an alkaline earth aluminosilicate. In some examples, the abradable coating may include at least one rare-earth disilicate, mullite, BSAS, BAS, SAS, at least one rare-earth oxide, at least one rare-earth monosilicate, or combinations thereof. Additionally, or alternatively, the abradable coating may include any of the compositions described herein with respect to the EBC.

In examples in which second coating layer 128 includes a TBC, the TBC may have a low thermal conductivity (i.e., both/either an intrinsic thermal conductivity of the material(s) that forms the TBC and/or an effective thermal conductivity of the TBC as constructed) to provide thermal insulation to substrate 112, bond coat 118, and/or layers of coating system 114. Heat is transferred through the TBC through conduction and radiation. The inclusion of rare-earth oxides such as ytterbia, samaria, lutetia, scandia, ceria, gadolinia, neodynia, europia, yttria-stabilized zirconia (YSZ), zirconia stabilized by a single or multiple rare-earth oxides, hafnia stabilized by a single or multiple rare-earth oxides, zirconia-rare-earth oxide compounds, such as RE$_2$Zr$_2$O$_7$ (where RE is a rare-earth element), hafnia-rare-earth oxide compounds, such as RE$_2$Hf$_2$O$_7$ (where RE is a rare-earth element), and the like as dopants may help decrease the thermal conductivity (by conduction) of the TBC.

In some examples, a doped coating layer may include a graded chemistry (in examples where the doped coating layer is a bond coat or an EBC) and/or graded porosity (in examples where the doped coating layer is an EBC). For example, a graded doped coating layer may include a horizontally graded coating layer having a dopant or a vertically graded coating layer having a dopant. In some examples, the grading may include a graded constituent of the coating layer. For example, a horizontal graded coating layer may include higher RE disilicate volume percent relative to a volume percent of RE monosilicate at or near a bond coat, with increasing amounts of RE monosilicate moving away from surface 116 toward surface 126.

Figure 3:
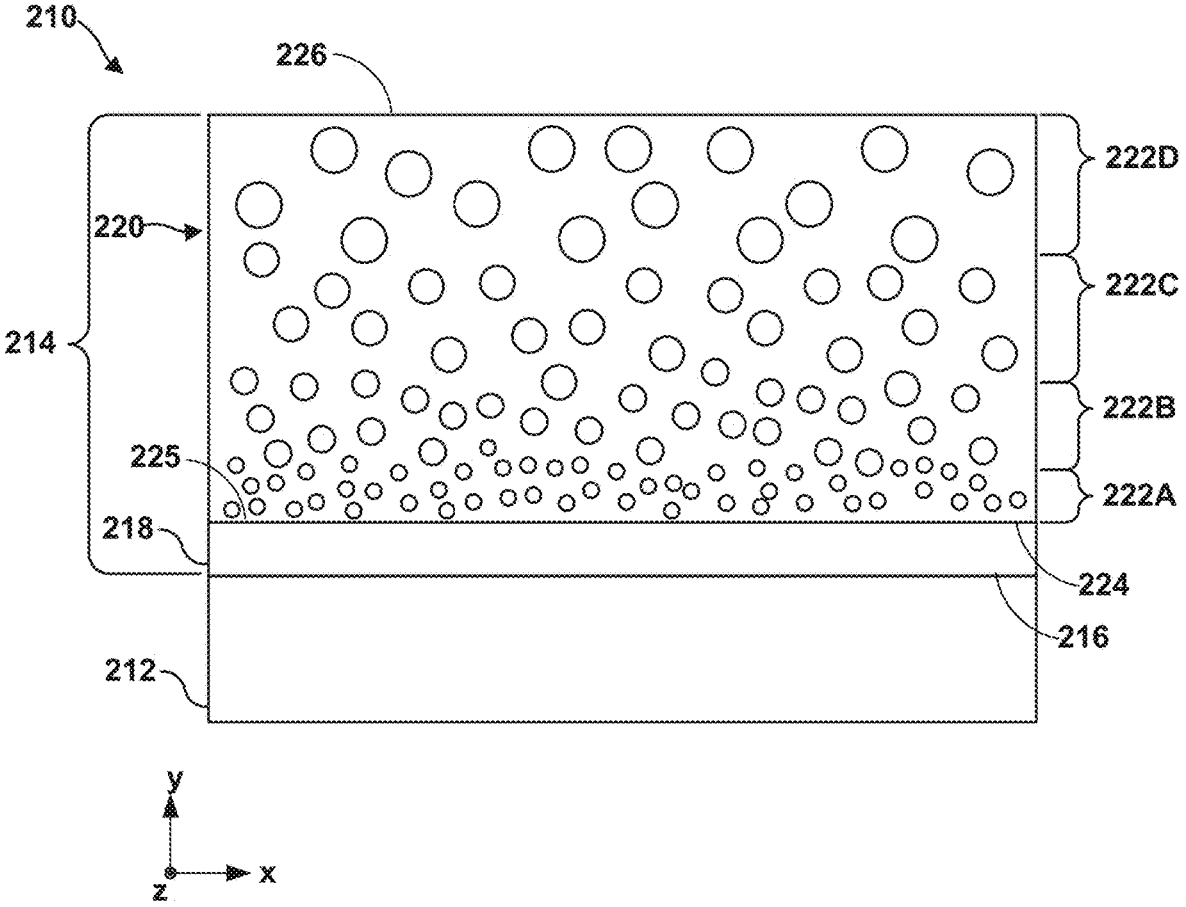
FIG. 3 is a conceptual diagram illustrating a cross-sectional view of an example component that includes a substrate and a coating system that includes a vertically graded coating layer having a dopant.

In some examples, a coating system may include vertically adjacent portions (e.g., adjacent in the y-direction) of a coating layer selected to control a microstructure or chemistry of the coating system to improve a functionality at a selected portion of a component, such as a selected portion of a surface of the component. FIG. 3 is a conceptual diagram illustrating a cross-sectional view of an example component 210 that includes a substrate 212 and a coating system 214 that includes a vertically graded coating layer 120 having a dopant. Component 210 may be the same as or substantially similar to components 10 and/or 110 discussed above in reference to respective FIGS. 1 and 2, expect for the differences described herein.

Component 210 includes bond coat 218 form on surface 216 of substrate 212 and coating 220 formed on surface 224 of bond coat 218. Coating 220 is formed to define a horizontal graded chemistry. For example, coating 220 may define a plurality of layers 222A, 222B, 222C, and 222D (collectively, layers 222). Layers 22 are arranged parallel to surface 216 of substrate 212. Each layer of layers 222 and may include a selected microstructure or chemistry. For example, layers 222 may include any of the coating materials discussed above in reference to FIGS. 1 and 2.

In some examples, each layer of layers 222 may be formed by tape casting. For example, a tape including one or more layers 222 may be prepared, positioned on component 210, and sintered to define a densified coating of coating system 214. Each layer of layers 222 (and/or each segment of the plurality of adjacent segments) may include a selected microstructure or chemistry. The selected microstructures and/or chemistries may be selected to improve a functionality at a selected positions on component 210. In some examples, a tape cast coating may be formed using at least one of slurry casting, tape casting, or gel casting. For example, a slurry used to form a tape may include components or precursors of a tape (e.g., particles, a pre-gellant material, an optional gelation initiator or promoter, optional additives, or other precursors of a tape) in a solvent. Each layer of layers 222 (and/or each segment of the plurality of adjacent segments) may be separately cast or cast with other layers (and/or segments). Multiple cast layers (and/or segments) may be assembled to form the tape cast coating for positioning and sintering on component 210. The tape cast coating may be used, for example, to form coating 220 on component 210 or portions of component 210 that cannot be coated by other techniques (e.g., shadowed regions that cannot be coated by, for example, air plasma spray) Additionally or alternatively, the microstructure of a tape cast coating may be tuned by controlling the chemistry, phase distribution, and/or grain size of the starting powders, controlling the solid loading in the slurry, and/or controlling the sintering conditions.

In examples in which coating 220 includes a doped EBC, layers 222 may define a graded rare-earth silicate composition. For example, the doped EBC may include a rare-earth monosilicate and a rare-earth disilicate, where coating 220 defines a first surface 225 adjacent to bond coat 218 and a second surface 226 opposing first surface 225. Coating 220 may include a first volume percent of the rare-earth disilicate (e.g., as illustrated by the spheres) that is greater than a first volume percent of the rare-earth monosilicate at or near first surface 225, and a second volume percent of the rare-earth monosilicate that is greater than a second volume percent of the rare-earth disilicate at or near second surface 226. For example, the volume percent of the rare-earth disilicate may decrease from layer 222A to layer 222D, whereas the volume percent of the rare-earth monosilicate may decrease from layer 222D to layer 222A.

In some examples, the concentration of the dopant may be graded. For example, coating 220 may include a volume percent of the dopant that is greater at or near first surface 225, and a second volume percent of the dopant at or near second surface 226. For example, the volume percent of the dopant may decrease from layer 222A to layer 222D.

Although illustrated and described above with respect to coating 220, in some examples bond coat 218 may define a graded chemistry (e.g., graded dopant concentration). In examples where bond coat 218 defines a graded dopant concentration, bond coat 218 may include a volume percent of dopant that is greater at or near surface 224, and a second volume percent of the dopant at or near second surface 216. For example, the volume percent of the dopant may decrease from surface 224 to surface 216.

Figure 4:
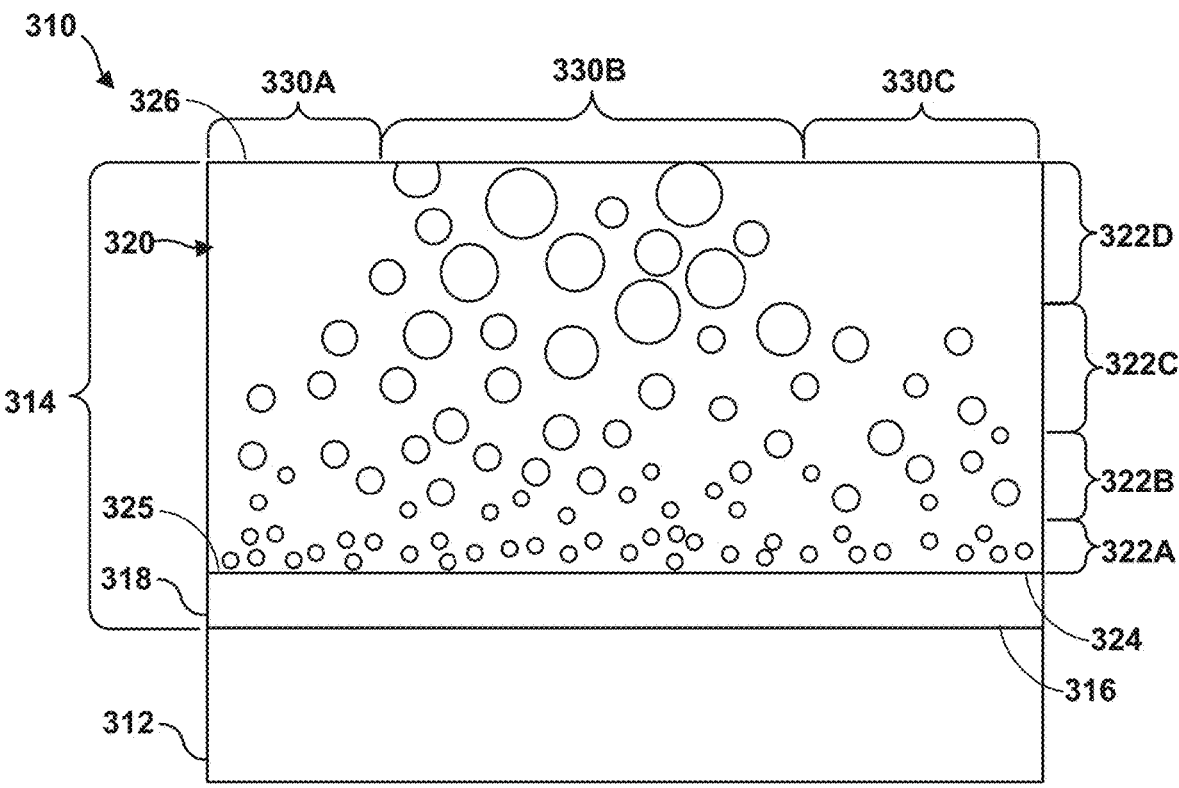
FIG. 4 is a conceptual diagram illustrating a cross-sectional view of an example component that includes a substrate and a coating system that includes a horizontally graded coating layer having a dopant.
Figure 4:
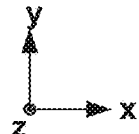

Additionally or alternatively, a coating system may include horizontally adjacent regions (e.g., adjacent in the x-direction) of a coating layer selected to control a microstructure or chemistry of the coating system to improve a functionality at a selected portion of a component, such as a selected portion of a surface of the component. FIG. 4 is a conceptual diagram illustrating a cross-sectional view of an example component that includes a substrate and a coating system that includes a horizontally graded coating layer having a dopant. Component 310 may be the same as or substantially similar to components 10, 110, and/or 210 discussed above in reference to respective FIGS. 1, 2, and 3, expect for the differences described herein.

Component 310 includes bond coat 318 form on surface 316 of substrate 312 and coating layer 320 formed on surface 324 of bond coat 318. Coating layer 320 is formed to define a vertical graded chemistry and a horizontal graded chemistry. For example, coating layer 320 may define a plurality of horizontal layers 322A, 322B, 322C, and 322D (collectively, layers 322) and a plurality of vertical regions 330A, 330B, and 330C (collectively, regions 330). In some examples, component 310 may include regions without layers 332. Layers 322 are arranged parallel to surface 316 of substrate 312. Regions 330 are arranged normal to surface 316. Each layer of layers 322 and each region of regions 330 may include a selected microstructure or chemistry. For example, layers 322 and regions 330 may include any of the coating materials discussed above in reference to FIGS. 1, 2, and 3.

In some examples, each layer of layers 322 and/or each region of regions 330 may be formed by tape casting, as described above. For example, a tape including one or more layers 322 and/or one or more regions 330 may be prepared, positioned on component 310, and sintered to define a densified coating of coating system 314.

In examples in which coating layer 320 includes a doped EBC, layers 222 and/or regions 330 may define a graded rare-earth silicate composition. For example, the doped EBC may include a rare-earth monosilicate and a rare-earth disilicate, where coating layer 320 defines a first surface 325 adjacent to bond coat 318 and a second surface 326 opposing first surface 325. Coating layer 320 may include a first volume percent of the rare-earth disilicate that is greater than a first volume percent of the rare-earth monosilicate at or near first surface 325 (e.g., as illustrated by the spheres), and a second volume percent of the rare-earth monosilicate that is greater than a second volume percent of the rare-earth disilicate at or near second surface 326. For example, the volume percent of the rare-earth disilicate may decrease from layer 322A to layer 322D, whereas the volume percent of the rare-earth monosilicate may decrease from layer 322D to layer 322A.

Additionally or alternatively, coating layer 320 may include a first volume percent of the rare-earth disilicate (e.g., as illustrated by the spheres) that is greater than a first volume percent of the rare-earth monosilicate at or near region 330B, and a second volume percent of the rare-earth monosilicate that is greater than a second volume percent of the rare-earth disilicate at or near regions 330A and/or 330C. In this way, coating system 314 may include coating layer 320 that defines a first region (e.g., 330B) and a second region (e.g., 330A or 330C) laterally adjacent to the first region, where a volume percent of the rare-earth disilicate is greater than a volume percent of the rare-earth monosilicate in the first region, and where a volume percent of the rare-earth monosilicate is greater than a volume percent of the rare-earth disilicate in the second region.

Although described in reference to an EBC, in other example, coating layer 320 may include other types of coatings, such as, for example, an abradable coating. For example, regions 330 may define a non-continuous abradable portion of coating system 314 of a gas turbine engine shroud that includes a first portion (e.g., region 330A), a second portion (e.g., region 330C), and a blade rub portion (e.g., region 330B). Blade rub portion 330B may extend between first portion and second portion, and may be configured to be abraded, e.g., by the tips of blades of a gas turbine engine, in order to form a relatively tight seal between component 310 and the blades. An abradability of blade rub portion 330B may include a disposition to break into relatively small pieces, granules, or powder, when exposed to a sufficient physical force. Abradability may be influenced by the material characteristics of the material forming blade rub portion 330B of coating system 314, such as fracture toughness and fracture mechanism (e.g., brittle fracture) and/or the porosity of the blade rub portion 330B. In this way, a portion of coating system 314 over a region of component 310 may be controlled by application of different regions 330 via casting to improve mechanical and/or chemical properties of the portion of coating system 314.

EXAMPLES

Figure 5:
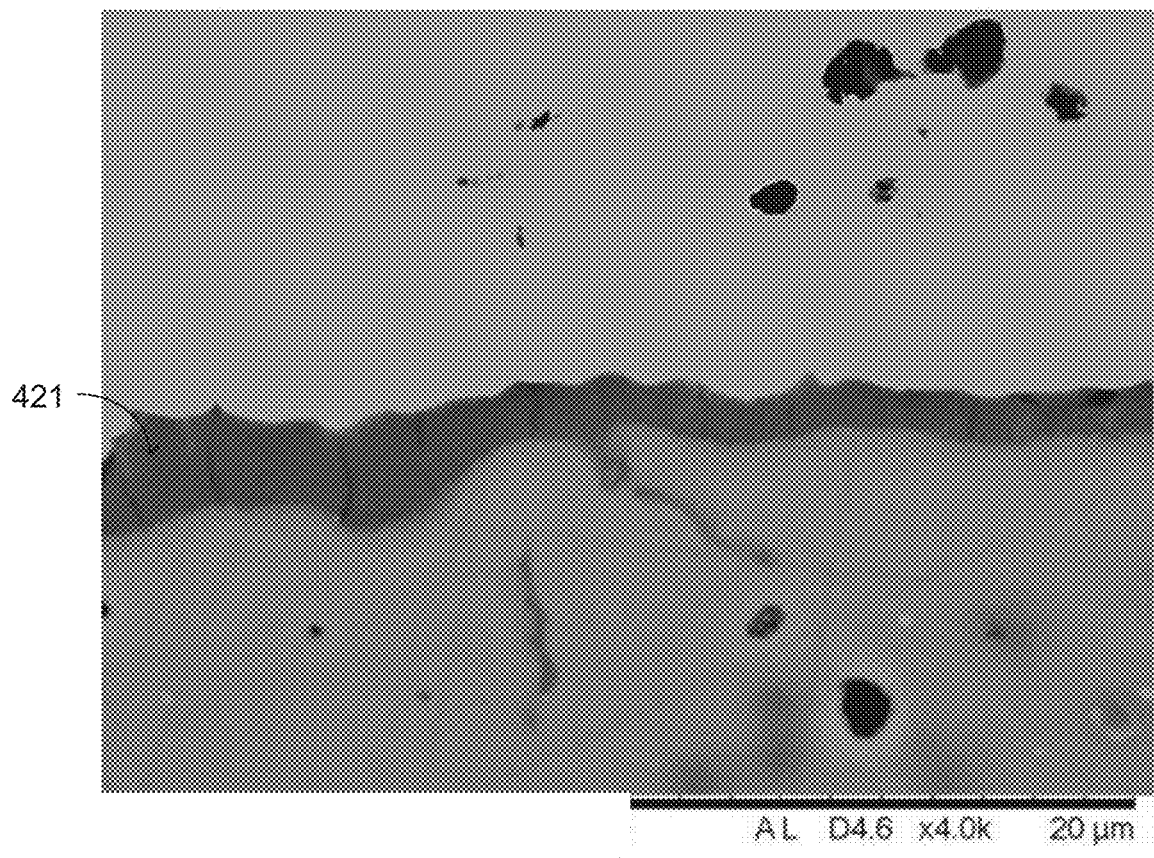
FIG. 5 is a scanning electron microscope (SEM) image of an example coating system having vertical cracks.
Figure 6:
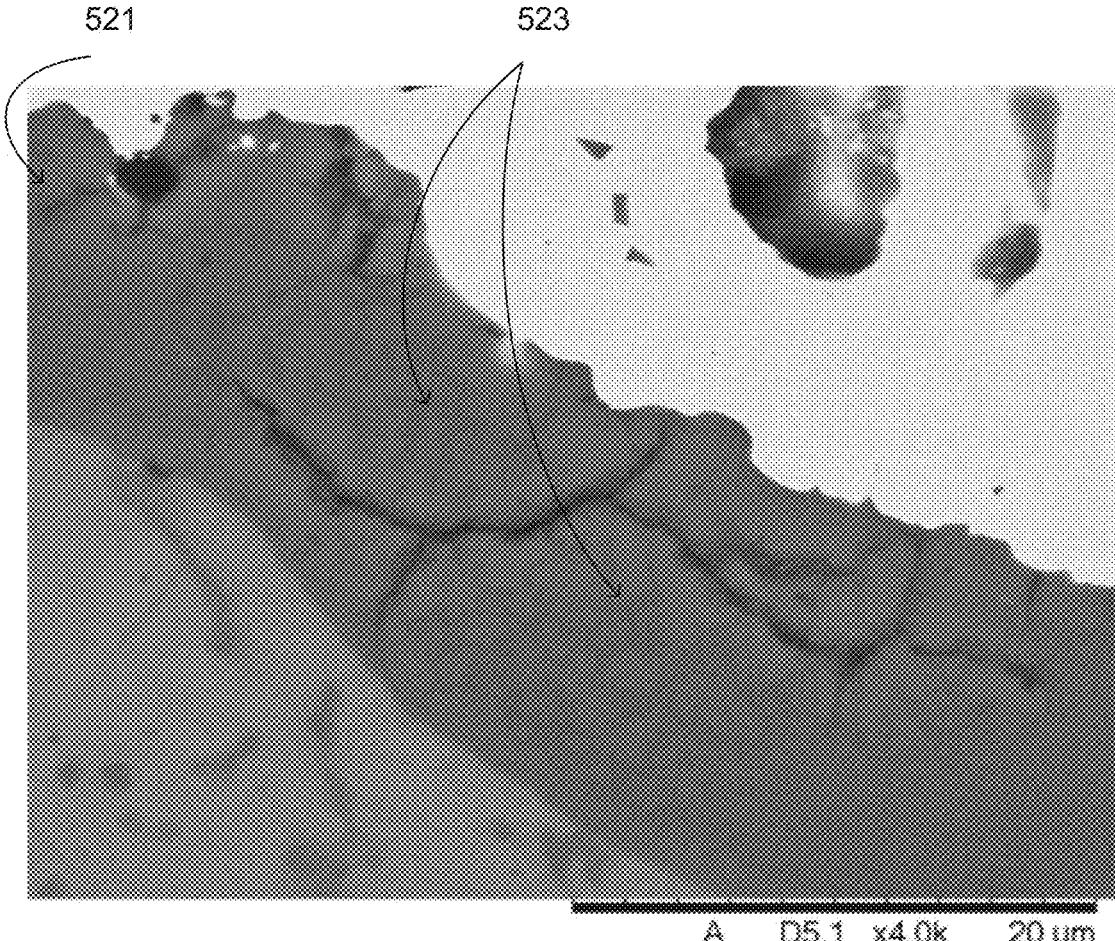
FIG. 6 is an SEM image of an example coating system having a combination of horizontal and vertical cracks.

FIGS. 5 and 6 are scanning electron microscope (SEM) images of example coating systems including TGO layers 421 (FIG. 5) and 521 (FIG. 6). TGO layer 421 and 521 may be examples of TGO layer 21 of FIG. 1, if the coating system were not to include a doped coating layer. TGO 421 of FIG. 5 is nearly completely crystalline, and TGO 521 of FIG. 6 includes crystalline regions 523 that appear brighter in contrast with the retained amorphous regions. As discussed above, amorphous regions of TGO may be more desirable because they are less prone to spallation.

Example 1

Figures 7, 8, 9:
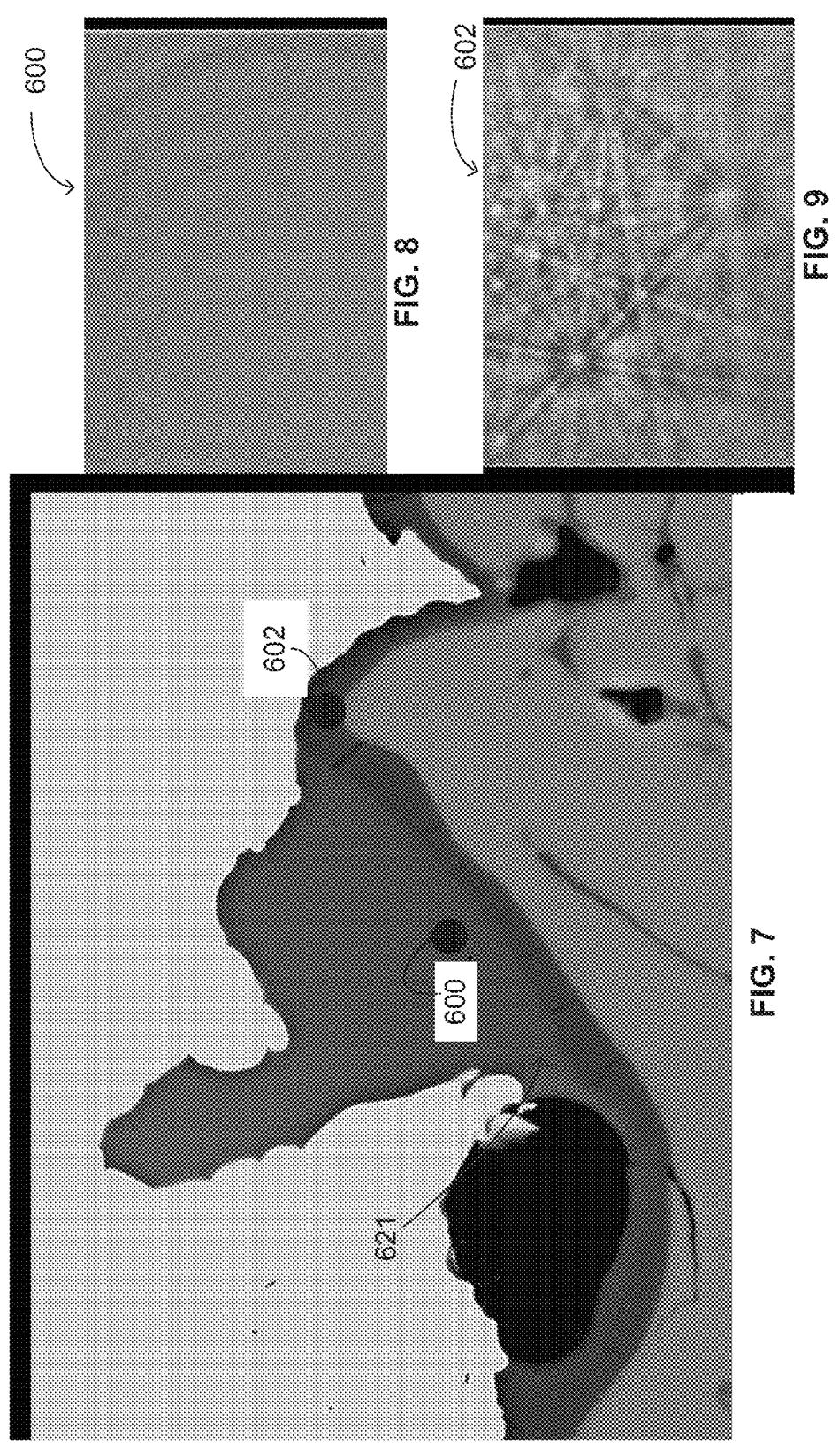
FIG. 7 is an SEM image of a region of thermally grown oxide (TGO) of an example coating system having two distinct contrasting composition, the first region including an amorphous TGO and the second region including a crystallized TGO.
FIG. 8 is an electron backscatter diffraction (EBSD) image of the first region of the TGO of FIG. 7.
FIG. 9 is an electron backscatter diffraction (EBSD) image of the second region of the TGO of FIG. 7.

Unlike FIGS. 5 and 6, FIG. 7 is an SEM image of a region of thermally grown oxide (TGO) of an example coating system including a region which includes a doped coating layer. As illustrated, TGO layer 621 of FIG. 7 has two distinct contrasting regions, with first region 600 including an amorphous TGO, which has not cracked, and second region 602 including a crystallized TGO, which has cracked. FIG. 8 is an electron backscatter diffraction (EBSD) image (taken at the black dot) of first region 600 of TGO layer 621 of FIG. 7. The absence of Kikuchi patterns (no visible lines) may indicate that the doped coating layer causes in first region 600 of TGO layer 621 to retain an amorphous structure. Conversely, FIG. 9 is an electron backscatter diffraction (EBSD) image (taken at the black dot) of second region 602 of the TGO layer 621 of FIG. 7. The presence of Kikuchi patterns (visible lines) may indicate that second region 602 has taken on a crystalline structure that is prone to cracking, as may be indicated by the cracks present in second region 602.

Figure 10:
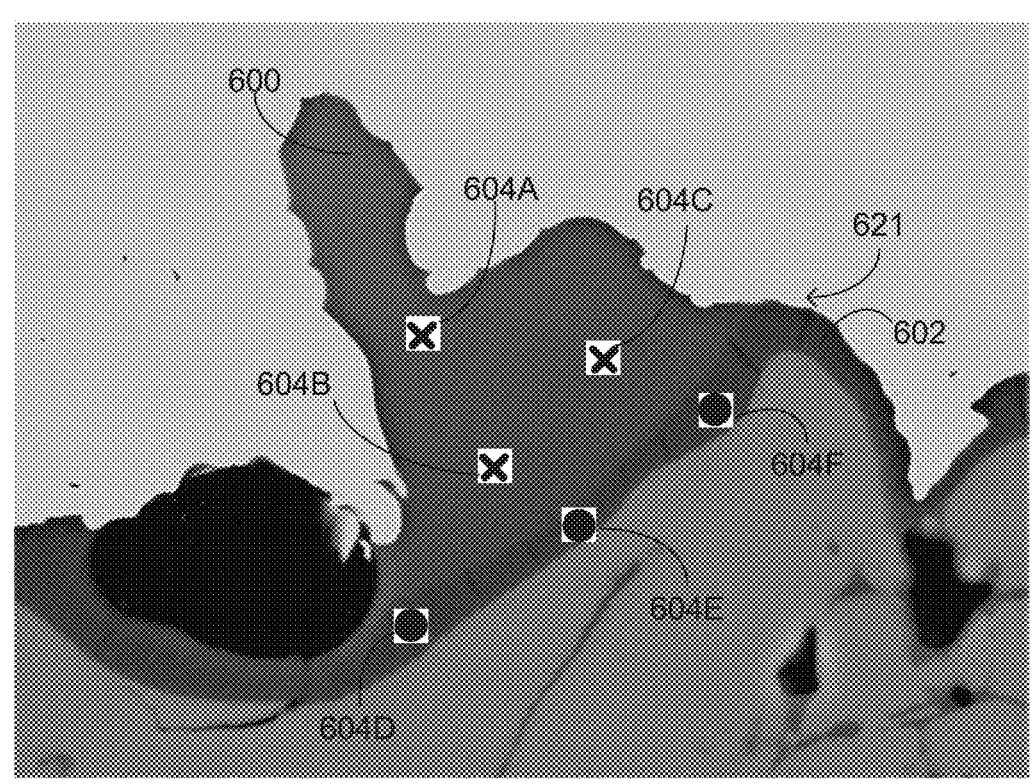
FIG. 10 is an SEM image of a TGO of an example coating system illustrating the composition of the TGO at various locations.

FIG. 10 is an SEM image of example TGO layer 621 of FIG. 7, illustrating energy-dispersive X-ray spectroscopy (EDS) scan points 604A, 604B, 604C, 604D, 604E, 604F for comparing the elemental composition of first region 600 of TGO layer 621 to the elemental composition of second region 602 of TGO layer 621. Three points 604A, 604B, 604C, were chosen within first region 600, and EDS scans were taken at the three points to determine the elemental composition of the TGO at each of the three points as an atomic percentage (at %). The average composition of the three points is presented in Table 1 as "Amorphous TGO (at %)."

Similarly, three points 604D, 604E, 604F were chosen within second region 602, and EDS scans were taken at the three points to determine the elemental composition of the TGO at each of the three points as an atomic percentage (at %). The average composition of the three points is presented in Table 1 as "Crystalline TGO (at %)." Although EDS only provides resolution to elements present around approximately 1 at %, the presence of those elements below the 1% threshold for EDS was confirmed by identified peaks.

TABLE 1

| Comparison of the Elemental Composition of Amorphous TGO to Crystalline TGO in Example 1. | | |
| --- | --- | --- |
| Element | Amorphous TGO (at %) | Crystalline TGO (at %) |
| Oxygen | 66.3 | 58.5 |
| Silicon | 28.8 | 40.9 |
| Aluminum | 4.0 | 0.4 |
| Sodium | 0.9 | 0.1 |
| Potassium | 0.8 | 0.1 |
| Ytterbium | 0.3 | NA |
| Calcium | 0.3 | NA |
| Iron | 0.1 | NA |

Example 2

FIG. 11 is an SEM image of a TGO of a second example coating system illustrating the composition of TGO layer 721 at various locations. TGO layer 721 includes amorphous first region 700 on top of crystalline second layer 702. a crystalline EDS results, presented below in Table 2, demonstrate the impact of glass modifier dopants, which are present at higher concentration in amorphous first region 700 than in crystalline second region 702. Glass modifier dopants in the present example include aluminum, sodium, and potassium.

Energy-dispersive X-ray spectroscopy (EDS) scan points 704A, 704B, 704C, 704D, 704E, 704F for comparing the elemental composition of first region 700 of TGO layer 721 to the elemental composition of second region 702 of TGO layer 721. Three points 704A, 704B, 704C, were chosen within first region 700, and EDS scans were taken at the three points to determine the elemental composition of the TGO at each of the three points as an atomic percentage (at %). The average composition of the three points is presented in Table 2 as "Amorphous TGO (at %)."

Similarly, three points 704D, 704E, 704F were chosen within second region 702, and EDS scans were taken at the three points to determine the elemental composition of the TGO at each of the three points as an atomic percentage (at %). The average composition of the three points is presented in Table 2 as "Crystalline TGO (at %)."

Example 2 illustrates that a thin, continuous amorphous TGO layer may be produced by inclusion of a coating layer comprising a dopant. It may be desirable to configure the chemistry of bond coat (18, FIG. 1) and or coating (20, FIG. 1) to form bilayer TGO 721. Producing an amorphous TGO in this manner may serve a twofold benefit to coating system (14, FIG. 1). First, since amorphous first region 700 resists cracking, first region 700 may remain hermetic, thereby helping to control and/or reduce the overall rate of TGO formation (oxidation). Second, by inclusion of a coating layer including a dopant configured to inhibit crystallization of the TGO that does form on the surface of an article at an operating temperature of the article, cracking of TGO layer 721 may be prevented in first region 700. Prevention of cracks may yield increased strength and/or less degradation of TGO layer 721 over time, resulting in the EBC remaining adherent for longer, and ultimately improving the life of the EBC/CMC system.

TABLE 2

Comparison of the Elemental Composition of Amorphous
TGO to Crystalline TGO in Example 1.

| Element | Amorphous TGO (at %) | Crystalline TGO (at %) |
|---|---|---|
| Oxygen | 55.9 | 55.9 |
| Silicon | 34.3 | 43.1 |
| Aluminum | 4.6 | 0.6 |
| Sodium | 1.2 | 0.2 |
| Potassium | 0.9 | NA |
| Ytterbium | 0.3 | NA |
| Calcium | 0.2 | NA |
| Iron | NA | NA |

Figure 12:
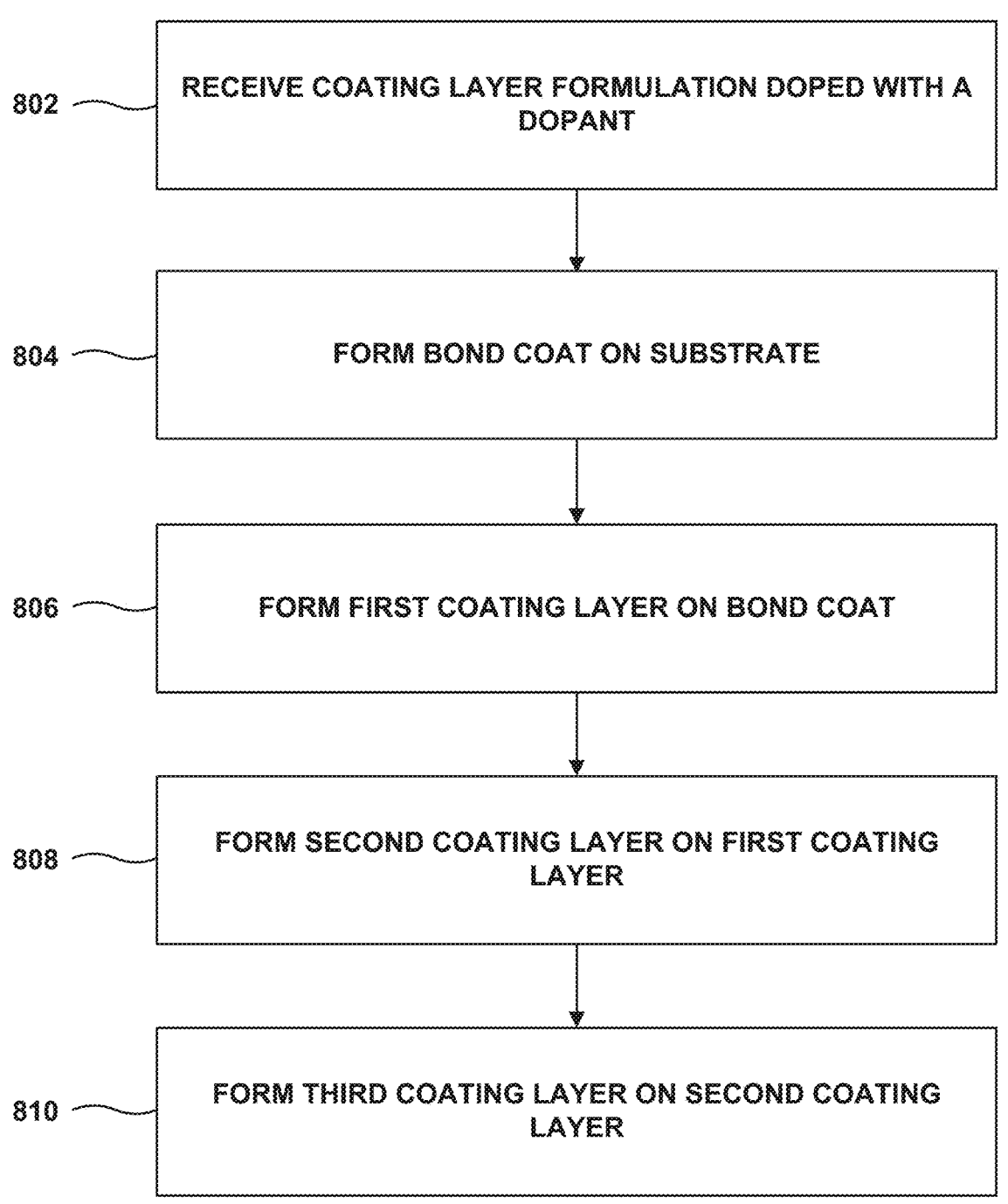
FIG. 12 is a flow diagram illustrating an example technique for forming an article that includes a substrate and a coating system that includes a coating layer having a dopant.

The coating systems including a coating layer including a dopant which includes a glass modifier described herein may be formed using any suitable manufacturing technique. FIG. 12 is a flow diagram illustrating an example technique for forming an example coating system including a doped coating layer. The technique illustrated in FIG. 12 will be described with respect to article 110 of FIG. 2. However, technique illustrated in FIG. 12 may be used to form other articles, and article 110 may be formed using other techniques.

The technique includes receiving a coating layer formulation doped with a dopant configured to inhibit crystallization of amorphous silicon dioxide thermally grown oxide on the surface at an operating temperature of an article (802). In some examples, the dopant may include a glass modifier, and the technique may further include adding a glass modifier dopant to coating layer formulation as an elemental addition or as a compound (e.g., $Al_2O_3$, $Na_2O$, $K_2O$, $Na_2Al_2O_4$, AlSi, $Yb_2O_3$, CaO, $Fe_2O_3$, or the like). In some examples, the dopant may be added as a solid solution constituent within a silicate glass into the raw materials (e.g., the coating layer formulation) of the EBC and/or bond coat, in any of a powder, a slurry, an ingot, a tape, mixtures or combinations thereof, or the like.

In some examples, the technique optionally includes forming bond coat 118 on substrate 112 (804). Bond coat 118 may be formed on surface 116 of substrate 112 using a thermal spray technique (e.g., atmospheric plasma spray (APS), high velocity oxygen fuel (HVOF) thermal spray, suspension plasma spray (SPS), detonation gun (D-Gun) thermal spray, or the like), slurry spray or paste, tape casting, electrophoretic deposition, physical vapor deposition (PVD), chemical vapor deposition (CVD), plasma spray physical vapor deposition (PS-PVD), electron-beam physical vapor deposition (EB-PVD), or the like. In some examples, article 110 may not include bond coat 118, and the technique may not include forming bond coat 118 on substrate 112 (804).

The technique includes forming coating layer 120 having a dopant on bond coat 118 (or substrate 112 if the coating layer having a dopant is bond coat 118, or if bond coat 118 is not present) (806). Coating layer 120 may be formed using, for example, a thermal spray technique (e.g., atmospheric plasma spray (APS), high velocity oxygen fuel (HVOF) thermal spray, suspension plasma spray (SPS), detonation gun (D-Gun) thermal spray, or the like), slurry spray or paste, tape casting, electrophoretic deposition, physical vapor deposition (PVD), chemical vapor deposition (CVD), plasma spray physical vapor deposition (PS-PVD), electron-beam physical vapor deposition (EB-PVD), or the like. In examples in which coating layer 120 includes a graded chemistry, forming coating layer 120 may include controlling an amount of at least one coating material applied by, for example, thermal spraying. For example, an amount of dopant or silicate may be controlled during thermal spraying to produce a graded chemistry. Additionally or alternatively, a graded chemistry may be formed by tape casting.

In examples in which forming coating layer includes tape casting, the technique may include forming a tape defining at least coating layer and/or segment (e.g., layers 322 and/or regions 330, illustrated in FIG. 4). For example, forming the tape may include applying, by a tape casting system, a first slurry containing the first coating material to a carrier film and applying, by the tape casting system, a second slurry containing the second coating to the carrier film adjacent to the first slurry. In some examples, forming the tape may include assembling the tape to position horizontally or vertically adjacent layers relative to one another. In some examples, forming the tape may include at least partially sintering the tape and/or infiltrating cracks to reduce a porosity of the tape. After forming the tape, the technique may include positioning the tape on a surface of a substrate 112 or bond coat 118, such as, for example, to define horizontally adjacent regions or vertically adjacent layers or on a portion of substrate 120 that would be shadowed in a thermal spray process. After positioning the tape, the technique may include heating the tape to sinter a constituent of at least one of the tape to form a densified coating, such as, to a temperature between about 1200° C. and about 1600° C., such as between about 1327° C. and about 1427° C.

The technique optionally includes forming second coating layer 128 on first coating layer 120 (808). Second coating layer 128 may be formed using, for example a thermal spray technique (e.g., atmospheric plasma spray (APS), high velocity oxygen fuel (HVOF) thermal spray, suspension plasma spray (SPS), detonation gun (D-Gun) thermal spray, or the like), slurry spray or paste, tape casting, electrophoretic deposition, physical vapor deposition (PVD), chemical vapor deposition (CVD), plasma spray physical vapor deposition (PS-PVD), electron-beam physical vapor deposition (EB-PVD), or the like.

The technique optionally includes forming third coating layer 130 on second coating layer 128 (810). Third coating layer 130 may be formed using, for example, a thermal spray technique (e.g., atmospheric plasma spray (APS), high velocity oxygen fuel (HVOF) thermal spray, suspension plasma spray (SPS), detonation gun (D-Gun) thermal spray, or the like), slurry spray or paste, tape casting, electrophoretic deposition, physical vapor deposition (PVD), chemical vapor deposition (CVD), plasma spray physical vapor deposition (PS-PVD), electron-beam physical vapor deposition (EB-PVD), or the like.

The following clauses illustrate example subject matter described herein:

Various examples have been described. These and other examples are within the scope of the following claims.

What is claimed is:

1. An article comprising:
a substrate defining a surface; and
a coating layer overlying the substrate, wherein the coating layer comprises a dopant configured to inhibit crystallization of amorphous silicon dioxide thermally grown oxide (TGO) between the coating layer and the substrate at an operating temperature of the article, wherein:
    the dopant comprises a glass modifier,
    the dopant is configured to migrate into the TGO to form a bilayer TGO comprising an amorphous first region on a crystalline second region, and
    the dopant is present in a concentration sufficient to stabilize the amorphous first region as a hermetic barrier during thermal cycling of the article through a temperature of 180° C. to 300° C., thereby inhibiting spallation of the coating layer caused by volume contraction of the crystalline second region during a B-cristobalite to a-cristobalite phase transformation.

2. The article of claim 1, wherein the glass modifier comprises one or more of aluminum, sodium, potassium, calcium, iron, or one or more rare-earth elements.

3. The article of claim 1, wherein the coating layer is a bond coat layer.

4. The article of claim 1, wherein the coating layer comprises an environmental barrier coating (EBC) further comprising at least one rare-earth monosilicate or rare-earth disilicate.

5. The article of claim 1, further comprising a bond coat on a surface of the substrate and between the coating layer and the surface of the substrate.

6. The article of claim 1, wherein the coating layer comprises an environmental barrier coating (EBC) further comprising at least one rare-earth monosilicate or rare-earth disilicate.

7. The article of claim 1, wherein the dopant comprises one or more compounds, and the one or more compounds comprise at least one of $Al_2O_3$, $Na_2O$, $K_2O$, $Na_2Al_2O_4$, AlSi, CaO, $Fe_2O_3$, $Y_2O_3$, $Yb_2O_3$, or mixtures or combinations thereof.

8. The article of claim 5, wherein the coating layer on the bond coat is part of the bond coat and forms a first region of the bond coat on a second region of the bond coat, and wherein the first region of the bond coat includes a greater amount of the dopant than the second region.

9. The article of claim 1, wherein the dopant comprises aluminum, sodium, and potassium.

10. The article of claim 9, wherein the dopant comprises more aluminum than potassium or sodium.

11. The article of claim 2, wherein the dopant comprises at least two of aluminum, sodium, potassium, ytterbium, calcium, or iron.

12. The article of claim 1, wherein coating layer comprises between about 0.1 mole percent (mol %) and about 15 mol % of the dopant.

13. The article of claim 1, wherein the coating layer comprises at least 2 mol % percent aluminum.

14. The article of claim 1, further comprising an abradable coating on the coating layer, wherein the abradable coating comprises at least one rare-earth monosilicate or rare-earth disilicate.

15. The article of claim 1, wherein the coating layer comprises graded chemistry, a graded porosity, or a graded chemistry and a graded porosity.

16. The article of claim 1, wherein the article is a high temperature component of a gas turbine engine.

17. A gas turbine engine component comprising:
a ceramic matrix composite (CMC) substrate defining at least a portion of the gas turbine engine component, wherein the CMC substrate comprises a silicon-containing material; and
a coating layer overlying the CMC substrate, wherein the coating layer comprises a dopant configured to inhibit crystallization of amorphous silicon dioxide thermally grown oxide (TGO) between the coating layer and the CMC substrate at an operating temperature of the gas turbine engine component, wherein:
    the dopant comprises a glass modifier, and
    the dopant is configured to migrate into the TGO to maintain at least a portion of the TGO in an amorphous phase that is substantially continuous and forms a hermetic barrier configured to reduce migration of oxidizing species into the CMC substrate while the component is thermally cycled through a temperature of 270° C.

18. The gas turbine engine component of claim 17, wherein the glass modifier comprises one or more of aluminum, sodium, potassium, calcium, iron, or one or more rare-earth elements.

19. A method comprising:
depositing a coating layer formulation on a substrate defining a surface to form a coating layer, wherein the coating layer comprises a dopant configured to inhibit crystallization of an amorphous silicon dioxide thermally grown oxide (TGO) between the coating layer and the substrate at an operating temperature of an article;
wherein:
    the dopant comprises a glass modifier the dopant comprises a glass modifier, the dopant is configured to migrate into the TGO to form a bilayer TGO comprising an amorphous first region on a crystalline second region, and the dopant is present in a concentration sufficient to stabilize the amorphous first region as a hermetic barrier during thermal cycling of the article through a temperature of 180° C. to 300° C., thereby inhibiting spallation of the coating layer caused by volume contraction of the crystalline second region during a $\beta$-cristobalite to $\alpha$-cristobalite phase transformation.

20. The method of claim 19, wherein the glass modifier comprises one or more of aluminum, sodium, potassium, calcium, iron, or one or more rare-earth elements.

* * * * *